Sept. 15, 1953  G. HERZOG ET AL  2,652,496
RADIOACTIVITY METHOD AND APPARATUS FOR BOREHOLE LOGGING
Filed March 28, 1950

INVENTORS
GERHARD HERZOG
ALEXANDER S. McKAY
BY
ATTORNEYS

Patented Sept. 15, 1953

2,652,496

UNITED STATES PATENT OFFICE 2,652,496

RADIOACTIVITY METHOD AND APPARATUS FOR BOREHOLE LOGGING

Gerhard Herzog and Alexander S. McKay, Houston, Tex., assignors to The Texas Company, New York, N. Y., a corporation of Delaware Application March 28, 1950, Serial No. 152,487

4 Claims. (Cl. 250—43.5)

This invention relates to the logging of wells or bore holes by measuring radioactivity and more particularly to an improved method of neutron logging in which neutrons bombard the formations traversed by the bore hole and, either scattered and slowed neutrons, or gamma rays induced in the formations by neutron bombardment are measured in order to provide information as to the nature of the formations.

As is generally well known, there are two types of so-called "neutron" logging. In one method a source of neutrons and a detector of neutrons disposed within a logging instrument or housing are passed through the bore hole. Neutrons from the source pass outwardly into the formations around the hole and, depending upon the nature of the formation bombarded, more or less of the neutrons are scattered within the formation, some of the neutrons passing back into the hole to strike the detector. In the other method, a source of neutrons and a gamma ray detector disposed in a housing are passed through the bore hole and a measurement is made of the intensity of gamma rays induced in the formations by the neutron bombardment. For purposes of brevity, the first of these methods will be referred to as the neutron-neutron method, indicating that neutrons pass out into the formations and that neutrons come back into the hole and are measured. The second method will be referred to as the neutron-gamma method, indicating that neutrons pass outwardly into the formations to induce gamma rays therein, some of which gamma rays pass back into the hole to be detected.

One of the most serious difficulties encountered in neutron-neutron and neutron-gamma ray logging is due to the influence of the fluids in the bore hole between the detecting instrument and the walls of the formations. This fluid may be either hydrocarbon oil or water or more frequently the mud used in the drilling of the bore hole. The penetration of neutrons through these hydrogen-containing fluids is rather limited and therefore substantial changes are produced on the logs when changes in the diameter of the hole occur. Furthermore, there is a detrimental effect on the neutron logs even in a hole of uniform diameter, i. e., with a constant amount of fluid around the logging instrument, this being due to the rather great effect which even thin layers of hydrogen-containing fluids have on neutrons. Various suggestions have been made for minimizing the effect of changes in hole diameter, such as by using a plurality of vertically separated detectors or by other geometrical arrangements. None of these suggestions for eliminating the effect of the bore hole fluid have proven too successful.

In the pending patent application of K. C. Crumrine, Serial No. 585,249 filed March 28, 1945, now U. S. Letters Patent No. 2,509,908, granted May 30, 1950, a device is described which comprises a solid sleeve of a hydrogen-free substance such as aluminum or the like adapted to be slipped over and around the logging instrument housing, the sleeve having a thickness such that it will displace most of the fluid surrounding the housing without causing the instrument to become stuck or wedged in the bore hole. The great difficulty, of course, with this arrangement is that due to irregularities in the formation walls, variations in diameter of the bore hole, etc., the sleeve cannot displace all of the fluid around the instrument. Furthermore, the logging instrument may become stuck in the hole in spite of all precautions. Again, where the hole is but slightly larger in diameter than the logging instrument including the outer sleeve, the entire instrument becomes more or less a piston or plunger and there is occasionally great difficulty in passing the instrument through the liquid filled hole.

In accordance with the present invention, the problem of the effect of the well fluid has been solved by displacing substantially all of the well fluid between the instrument housing and the hole walls with a fluid containing little or no hydrogen and preferably having a low capture cross-section for slow neutrons. In one embodiment of the invention, the producing formations at the bottom of the bore hole are logged by spotting a liquid, having a density greater than water, mud or oil at the bottom of the hole between the logging instrument and the walls of the producing formations. For neutron-gamma logging, a material such as carbon tetrachloride is satisfactory since this liquid is heavier than the well fluids and will displace these fluids at the desired location. In logging the entire bore hole, all of the bore hole fluids can be displaced by a liquid of the type described. Where it is desired to make measurements at several predetermined depths in the bore hole, a packer can be set just below the desired depth and then the well fluid displaced for a few feet above the packer by a liquid such as carbon tetrachloride.

In some instances, the formation pressure may be less than that of the liquid in the hole and in that case a mud can be made using, say, carbon tetrachloride in place of water which mud would have a low filtration loss.

In another embodiment of the invention, an elongated rubber bag or sheath is placed around the greater part of the logging instrument housing and is partly filled with liquid which will absorb slow neutrons in a negligible amount. It has been found that when such an arrangement is passed downwardly through a liquid-filled bore hole, the liquid between the housing and the sheath will spread upwardly through the space between the housing and the sheath thus permitting the entire assembly to pass freely downwardly through the well fluid. However, when the instrument is pulled upwardly during the logging operation, the pressure of the well fluid above the instrument forces the liquid within the sheath downwardly, thus expanding the lower portion of the sheath into contact with the walls of the formations. The instrument with its surrounding sheath can, however, be pulled upwardly since the pressure of the well fluid eventually overcomes the pressure exerted in the sheath in an outward or radial direction. The neutron source and the detector are disposed in the lower portion of the logging instrument housing and are thus horizontally within the expanded portion of the sheath. With such an arrangement, there is substantially no absorption of the neutrons, either those passing outwardly from the source to the formations or those which are scattered and slowed down and pass back from the formations into the instrument housing.

For a better understanding of the invention, reference may be had to the accompanying drawing in which.

Figure 1:
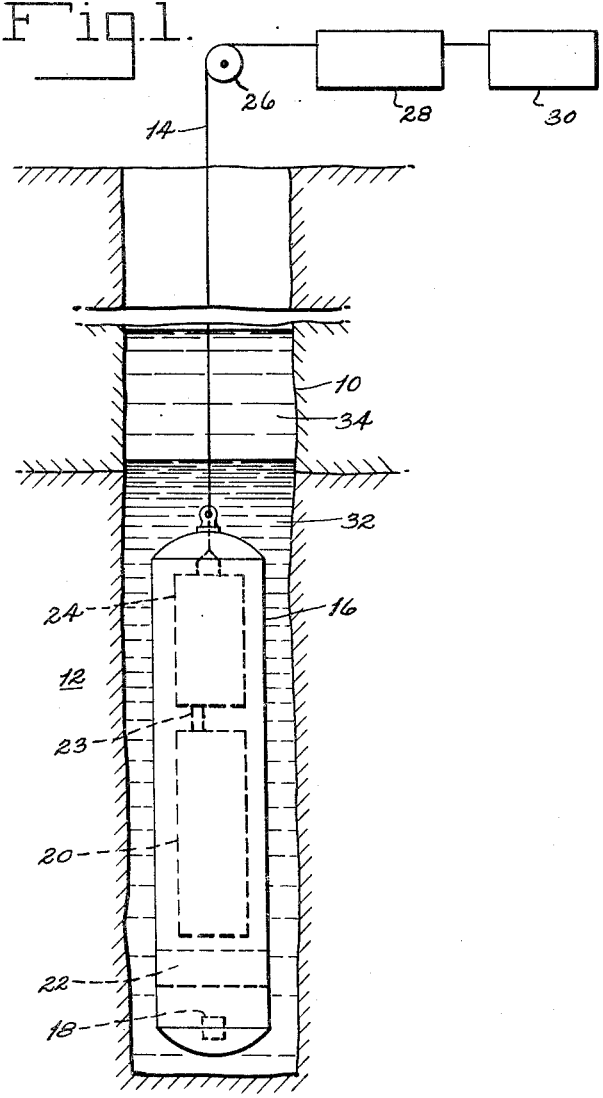
Figure 1 is a vertical sectional elevation through a bore hole showing a logging instrument in the bottom of the hole surrounded by a liquid having little or no absorption for neutrons.

Referring to the drawing and particularly to Figure 1, a bore hole 10 is shown as drilled downwardly into a producing formation 12. Suspended by means of the cable 14 within the hole 10 is an elongated logging instrument housing 16, this housing containing a source 18 of neutrons such as a mixture of radium and beryllium, a radiation detector 20 and a shield 22 between the source and the detector for preventing direct radiation from the source from reaching the detector. The output of the detector 20 is connected by wires 23 to a suitable instrument 24 by means of which the output of the detector is amplified and transmitted upwardly over the cable 14 to the surface. At the surface the cable passes over a cable or depth measuring device 26 and to an amplifier 28, the output of which in turn passes to a suitable recorder 30.

Assuming that a neutron-neutron log is to be made, a quantity of a liquid 32 is spotted in the bottom of the hole 10 by any suitable means, such as by conducting it down through a small tubing string, not shown, or by lowering it in a container which can be opened at a predetermined time to permit the liquid to flow into the lower portion of the hole to displace the bore hole fluid 34. The liquid 32 should have a density greater than the liquid 34 and should be such that it will have a low capture cross-section, i. e., low absorption for neutrons. With the arrangement as shown in Figure 1 neutrons from the source 18 will pass outwardly into the formation 12 wherein they will be scattered at a rate depending generally upon the amount of hydrogen in the formation, some of the scattered neutrons passing from the formation 12 back into the hole where they strike the detector 20 to be subsequently amplified and recorded at the surface by the device 30. In this case, of course, the detector 20 will be of a type designed to detect neutrons and may be a proportional counter such as is disclosed in the U. S. Letters Patent issued June 22, 1948, to K. C. Crumrine and Gerhard Herzog, Number 2,443,731, although any other type of neutron detector may be used. If the bore hole fluid 34 were not displaced by the liquid 32, many of the neutrons from the source 18 would be slowed down and absorbed or diffused within the fluid 34 and some of the thus diffused neutrons would be registered by the detector 20, thus causing an inaccurate log to be produced. This is particularly true in neutron-neutron logging since neutrons must pass twice through the fluid surrounding the logging instrument, once when passing from the source to the formation and again when passing from the formation to the detector. When the bore hole fluid 34 is displaced by the liquid 32, however, there will be substantially no slowing down and absorption or diffusion of the neutrons within the space between housing 16 and the walls of the formation 12 and a much more accurate log will thus result.

Assuming that a neutron-gamma log is to be made rather than a neutron-neutron log, the detector 20 should be a gamma ray detector, and while any suitable type of gamma ray detector may be used, it is preferred to use a gamma ray counter of the kind disclosed in the U. S. Letters Patent issued March 19, 1946, to D. G. C. Hare, Number 2,397,071. The operation will be substantially the same as that described with reference to the making of a neutron-neutron log. Neutrons from the source 18 pass into the formation 12 where, due to nuclear collision with the atoms of the formation, gamma rays may be induced, some of these gamma rays passing back into the hole where they strike the detector 20. In this case, the liquid 32 may be a liquid containing no hydrogen, such as carbon tetrachloride. In the case of neutron-gamma logging, one is concerned mainly with the induced gamma rays passing from the formation to the detector and the neutrons passing from the source 18 into the formation will not be appreciably slowed down and absorbed in the carbon tetrachloride. Although slow neutrons from the formation 12 might be absorbed by the chlorine in the carbon tetrachloride, in this case no measurement is made of the slow neutrons, and for this reason, carbon tetrachloride will be satisfactory.

Although Figure 1 shows the instrument at the bottom of the hole, it is understood that if it is desired to make a measurement at other depths in the hole any suitable form of packer or plug can be placed in the hole just below the location at which it is desired to make the measurement and the liquid 32 can then be placed above this packer so as to surround at least that portion of the housing 16 containing the source 18 and the detector 20.

It is also to be understood that other liquids should be used than carbon tetrachloride for neutron-neutron logging, the main essentials being that the liquid be non-hydrogenous and have a low capture cross-section for slow neutrons. Among other suitable liquids are Freon, iron pentacarbonyl and certain of the fluorocarbons, particularly $C_{21}F_{44}$.

Figure 2:
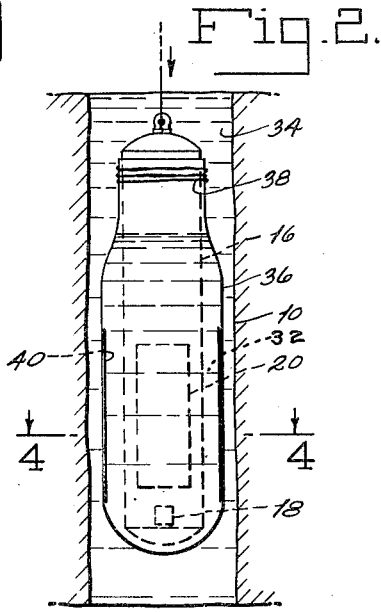
Figure 2 is a vertical sectional elevation through a portion of a bore hole showing a logging instrument provided with a surrounding sheath being lowered therethrough.

In Figure 2 the instrument housing 16 is shown as substantially surrounded by a flexible, resilient, impervious bag or sheath 36, this sheath being securely attached at its upper end to the upper end of the housing as by means of the wire 38. Within the sheath 36 which may be of rubber is a quantity of the liquid 32 and this may be of any of the types previously described.

Figure 3:
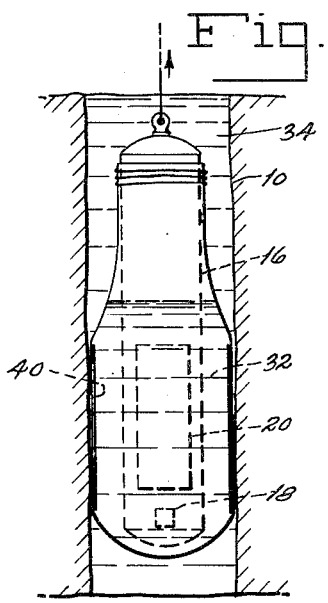
Figure 3 is a view similar to Figure 2 but showing the same instrument being raised through a section of the hole.

When the assembly shown in Figure 2 is being lowered into the bore hole through the bore hole fluid 34, the liquid 32 tends to spread vertically in a more or less uniform layer between the exterior of the housing 16 and the interior of the sheath 36 and the assembly will have sufficiently small overall diameter that it can be lowered easily through the hole. The logging of the formations is usually done while the instrument is passing upwardly through the hole. As shown in Figure 3, when the assembly is pulled upwardly, the pressure of the bore hole fluid 34 tends to squeeze the fluid 32 within the sheath downwardly so as to expand the lower portion of the sheath outwardly into contact with the walls of the hole although the well fluid can still pass downwardly around the sheath. Since the source 18 and the detector 20 are disposed within the lower portion of the housing 16, they will be surrounded horizontally by the liquid 32 and as has been explained hereinabove, since this liquid has little if any effect in absorbing neutrons, the neutrons or the induced gamma rays which are detected by the detector 20 will be only those which pass inwardly from the formation to the detector, and accurate logs will result.

Figure 4:
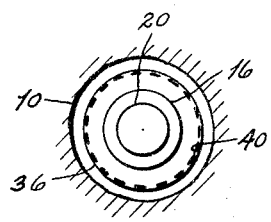
Figure 4 is a sectional view on the line 4—4 of Figure 2.

In order that the expanded sheath 36 will not be unduly deformed by irregularities in the walls of the bore hole, vertical strips or stays 40 shown more clearly in Figure 4 may be attached to the inner surface of the lower portion of the sheath to stiffen that part of the sheath having contact with the formation walls. These stays may be of any suitable material such as spring steel or brass.

It is contemplated that with the arrangement shown in Figures 2 and 3, instead of utilizing a liquid within the sheath, a non-hydrogenous gas such as carbon dioxide may be used, this gas, of course, being under sufficient pressure to expand the sheath as shown in Figure 3 into engagement with the walls of the hole. One way of accomplishing this would be to place one or more capsules of compressed carbon dioxide in the sheath with any suitable means for opening the capsules at the desired depth in the hole, as by impact with the bottom of the hole, by a time-controlled mechanism, a separate wire line passing upwardly to the surface which can be pulled at the desired time, etc.

When a gas is used within the sheath, the sheath may be provided with a suitable relief valve for venting the gas into the hole when the pressure within the sheath exceeds that of the well fluids.

It is also possible and may be desirable to use a powdered substance such, for example, as graphite or sodium carbonate within the sheath. For use at great depths and pressures, it would be desirable to fill the pore spaces of the powder with one of the above-mentioned liquids to prevent the collapse of the freely flowing powder into a solid mass.

Obviously, many other modifications and variations of the invention as hereinbefore set forth may be made without departing from the spirit and scope thereof, and, therefore, only such limitations should be imposed as are indicated in the appended claims.

We claim:

1. A device for logging a bore hole traversing subsurface formations and containing a fluid comprising an elongated instrument housing adapted to be passed through the hole, a cable on which said housing is suspended from the surface, a source of primary radiation and a detector of secondary radiation in the lower portion of said housing, a flexible impervious sheath attached to said housing near its upper end and surrounding the lower portion of the housing, and a quantity of a fluid-like substance in said sheath, said substance being substantially non-hydrogeneous and having a low capture cross-section for slow neutrons.

2. A device for logging a bore hole traversing subsurface formations and containing a liquid comprising an elongated instrument housing adapted to be passed through the hole, a cable on which said housing is suspended from the surface, a source of neutrons and a gamma ray detector in the lower portion of said housing, a flexible impervious sheath attached to said housing near its upper end and surrounding the lower portion of the housing, and a quantity of liquid in said sheath, said liquid being substantially non-hydrogeneous and having a low capture cross-section for slow neutrons.

3. A device for logging a bore hole traversing subsurface formations and containing a liquid comprising an elongated instrument housing adapted to be passed through the hole, a cable on which said housing is suspended from the surface, a source of neutrons and a slow neutron detector in said housing, a flexible impervious sheath attached to said housing at its upper end and substantially surrounding said housing, and a quantity of liquid between said sheath and said housing, said liquid being substantially non-hydrogeneous and having a low capture cross-section for slow neutrons.

4. A device for logging a bore hole traversing subsurface formations and containing a liquid comprising an elongated instrument housing adapted to be passed through the hole, a cable on which said housing is suspended from the surface, a source of primary radiation and a detector of secondary radiation in the lower portion of said housing, a resilient impervious sheath attached to said housing near its upper end and surrounding the lower portion of the housing and a quantity of liquid in said sheath, said liquid being substantially non-hydrogeneous and having a low capture cross-section for slow neutrons, the arrangement being such that while the instrument housing is being lowered through the hole, the liquid within the sheath will spread out upwardly between the sheath and the housing, and while the instrument housing is being pulled upwardly by said cable, the liquid within the sheath will tend to move downwardly between the sheath and the housing thereby expanding the lower portion of the sheath into engagement with the walls of the surrounding formations so as to displace said first-mentioned liquid.

GERHARD HERZOG.
ALEXANDER S. McKAY.

References Cited in the file of this patent

UNITED STATES PATENTS

| Number | Name | Date |
|---|---|---|
| 78,447 | Fleming | June 2, 1868 |
| 1,496,698 | Wolfe | June 3, 1924 |
| 1,850,218 | Thomas | Mar. 22, 1932 |
| 2,207,001 | Dillon | July 9, 1940 |
| 2,342,884 | Moore | Feb. 29, 1944 |
| 2,509,908 | Crumrine | May 30, 1950 |
| 2,515,534 | Thayer et al. | July 18, 1950 |